United States Patent [19]

Rowe et al.

[11] Patent Number: 4,906,021
[45] Date of Patent: Mar. 6, 1990

[54] FLATBED SEMI-TRAILER VEHICLE

[75] Inventors: John C. Rowe, Otterbein; Floyd D. Melchi, Remington, both of Ind.

[73] Assignee: Truck Trailer Design, Inc., Remington, Ind.

[21] Appl. No.: 172,691

[22] Filed: Mar. 23, 1988

Related U.S. Application Data

[63] Continuation-in-part of Ser. No. 53,257, May 22, 1987, Pat. No. 4,761,031.

[51] Int. Cl.$^4$ .............................................. B62D 33/02
[52] U.S. Cl. .................................... 280/789; 296/182; 105/422
[58] Field of Search ............... 280/785, 800, 798, 799, 280/781, 678, 683, 789; 296/182, 204

[56] References Cited

U.S. PATENT DOCUMENTS

| | | | |
|---|---|---|---|
| 2,851,281 | 9/1958 | Felburn | 280/789 |
| 3,201,141 | 8/1965 | Bernstein et al. | 280/683 |
| 3,420,193 | 1/1969 | Austgen | 105/422 |
| 3,623,744 | 11/1971 | Bertness | 280/789 |
| 4,202,564 | 5/1980 | Strader | 280/678 |
| 4,266,381 | 5/1981 | Deller | 52/177 |
| 4,526,418 | 7/1985 | Martin | 296/204 |
| 4,564,233 | 1/1986 | Booher | 296/182 |
| 4,645,258 | 2/1987 | Ohmura et al. | 296/204 |
| 4,761,031 | 8/1988 | Rowe et al. | 296/182 |

FOREIGN PATENT DOCUMENTS 2441530 11/1979 France.
2568535 7/1984 France.

Primary Examiner—Richard A. Bertsch
Attorney, Agent, or Firm—Richard Bushnell, Trexler, Bushnell, Giangiorgi & Blackstone, Ltd

[57] ABSTRACT

A lightweight, flatbed semi-trailer vehicle constructed substantially entirely of lightweight, high-strength structural members and capable of being utilized in conjunction with a truck tractor. The vehicle does not require flooring or decking and comprises at least two longitudinal spaced apart support members, and a plurality of transverse support members bolted to the upper surfaces of the longitudinal support members for use as a lowermost tier of dunnage. A stress plate provides structural rigidity to the design and serves as a second means of interconnecting the longitudinal support members. The vehicle also is equipped with unique fluid suspension means for absorbing and dampening road vibrations and offsetting any adverse effects caused by the elimination of a lower tier of dunnage.

11 Claims, 3 Drawing Sheets

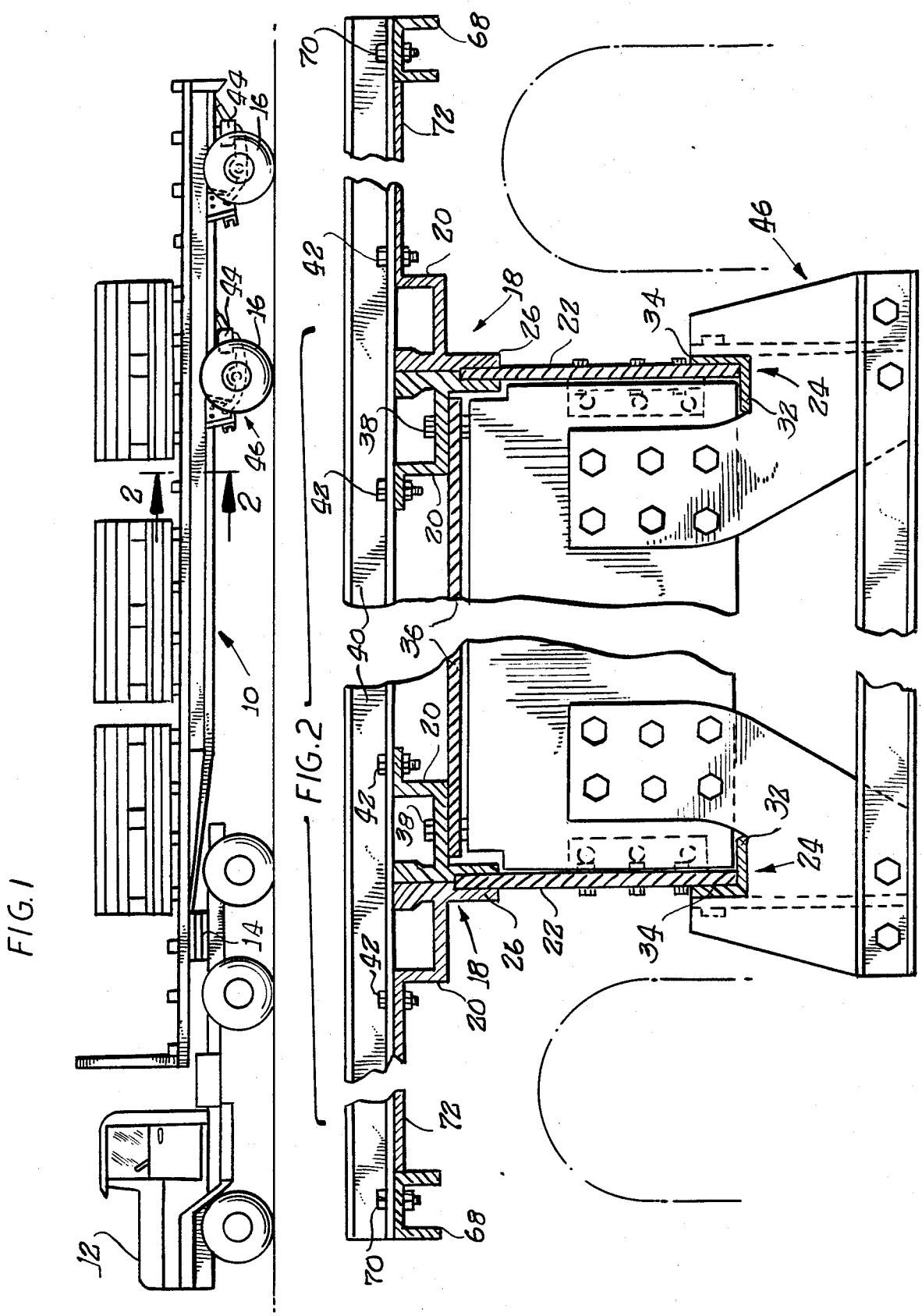

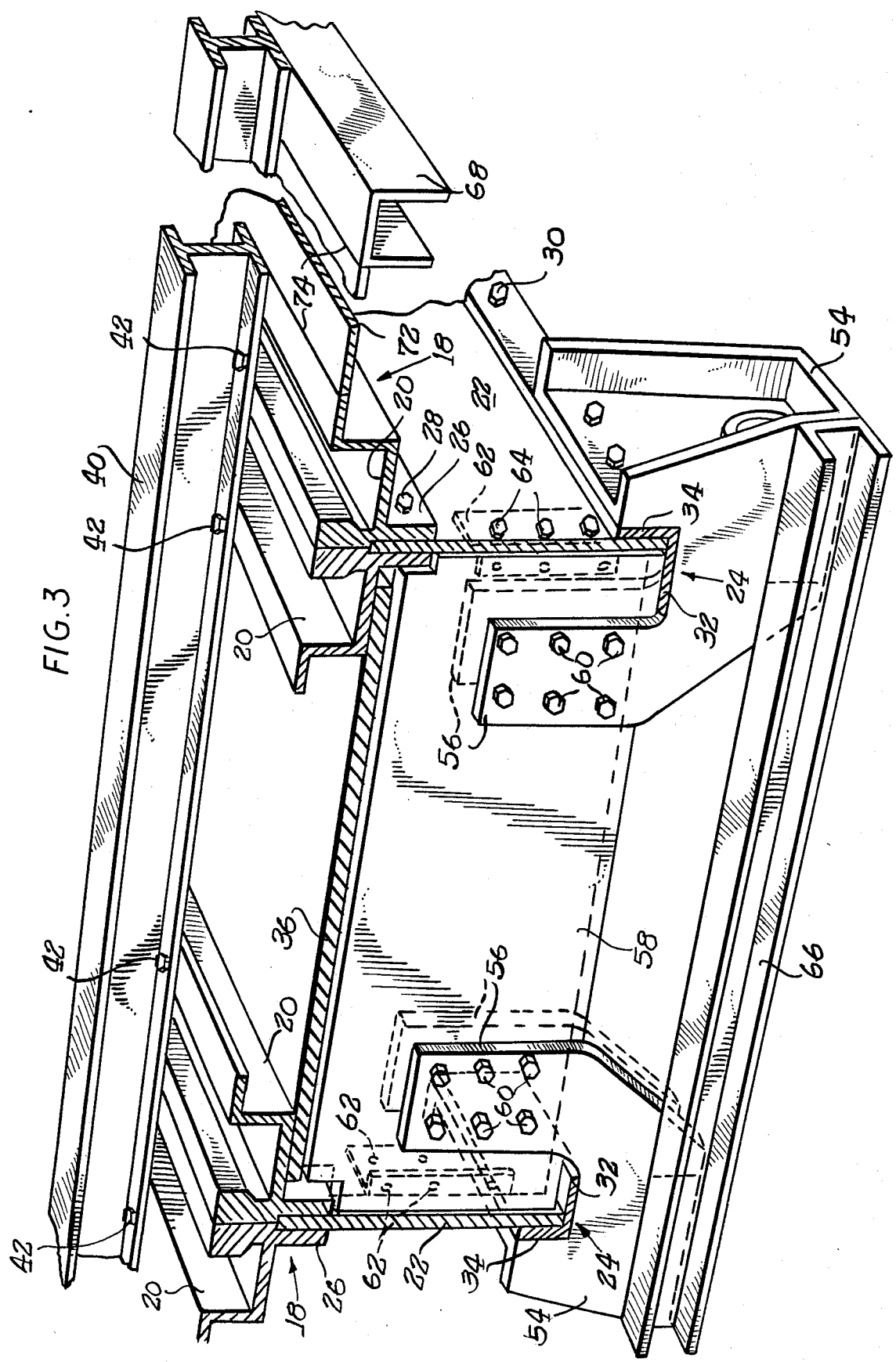

FLATBED SEMI-TRAILER VEHICLE

This application is a continuation-in-part of application Serial No. 053,257, filed May 22, 1987, now Pat. No. 4,761,031.

BACKGROUND OF THE INVENTION

This invention relates to a vehicle used for transporting freight loads, commonly referred to as a semi-trailer.

For purposes of highway shipment, unit loads of wall board, lumber and the like are routinely placed on a flatbed semi-trailer which in turn is attached to, and supported by a fifth wheel device on a modern truck tractor.

Currently, semi-trailers of the type referred to are primarily constructed of longitudinal and transverse steel support members, attached to and covered by heavy gauge sheet metal flooring or decking sections, resulting in a platform-like upper surface upon which the units loads of freight are loaded.

Normally semi-trailers are loaded by utilizing standard motorized forklift trucks. This type of loading procedure requires dunnage to be placed between the lowest tier of freight and the flatbed semi-trailer platform-like upper surface, as well as between each subsequent tier of freight. The dunnage allows for space in which the fork-like projections of a forklift truck can be maneuvered during loading and unloading operations, as well as providing support for the unit freight loads during transport. In most cases, the dunnage is formed from the same type of material as the freight being transported. This will prevent damage to the freight during transport over rough roadways which would otherwise occur if there were direct contact between the freight and harder surfaces such as steel for example.

The result of the above-described standard semi-trailer construction, combined with the significant amounts of dunnage normally required to properly load a standard 40 foot semi-trailer with freight is a highway vehicle normally having an overall weight in excess of 15 tons, not including the weight of the commodity to be transported.

The fuel expense associated with the operation of such a semi-trailer/truck tractor in addition to the state and federal restrictions on highway vehicle weight have long since created the need for a practical transport vehicle designed to allocate only the minimum amount of weight necessary to the actual vehicle structure itself, and any dunnage required, thus allowing for a maximum amount of freight capacity.

One prior attempt at overall weight reduction design suggested dividing the standard 40 foot length of a semi-trailer into two equal sections, joined together and supported by another series of wheels at the 20 foot point. This design reduced the load requirements of the individual support members and therefore allowed for the use of lighter weight support beams. However, maneuverability of this design proved problematical and positioning the freight to achieve proper weight distribution made loading procedures difficult and time consuming.

SUMMARY OF THE INVENTION

An important object of this invention is to provide a unique, lightweight, flatbed semi-trailer vehicle enabling increased load capacities.

A further object of this invention is to provide a novel semi-trailer vehicle constructed so as to reduce its weight and also for minimizing the amount of dunnage required.

A related object is to provide a semi-trailer vehicle equipped with improved suspension means to prevent damage to the cargo being transported.

Still another object of this invention is to provide a novel vehicle of the above-described type which may be quickly and easily maneuvered and loaded in accordance with standard loading procedures.

To attain these objects, a semi-trailer vehicle according to the invention comprises a pair of longitudinal support beams, spaced apart in parallel relationship, and extending forward from the rear of the semi-trailer to a front wall positioned perpendicular to said supports. Further, said aluminum longitudinal support beams are joined together by series of shorter, aluminum, transverse cross-beams such that said transverse beams are normal to and joined to the upper surface of the longitudinal support beams.

A rectangular longitudinal stress plate, equal in length to said longitudinal support beams, provides a second means of interconnection between the two longitudinal support beams at a point below the plurality of transversely mounted cross-beams.

This inventive arrangement allows the series of transverse cross-beams to function not only as structural support members, but also as the lowest tier of dunnage, while additionally eliminating the need for metal or other flooring sections normally included in standard semi-trailer designs.

Unique suspension means are also incorporated into the semi-trailer design to provide a smoother ride and offset any adverse effects caused by eliminating the lowest tier of dunnage and placing the freight loads directly upon said transverse cross-beams.

As a consequence of this innovative semi-trailer vehicle, standard load support characteristics and vehicle maneuverability remain constant, yet vehicle weight is significantly decreased and the need for an entire level of dunnage is eliminated. This significant reduction in weight permits the transport of heavier freight loads and saves expensive fuel dollars.

Other objects and advantages will become apparent from the attached detailed description and upon reference to the drawings.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures in which like reference numerals identify like elements, and in which:

FIG. 1 is a side view showing the preferred embodiment of the present invention when coupled to a truck tractor and having a representative load of freight positioned upon the inventive semi-trailer vehicle;

FIG. 2 is a broken apart sectional view taken along line 2—2 in FIG. 1 showing a portion of the suspension means included as part of the invention;

FIG. 3 is a perspective view of that portion of the suspension means shown in FIG. 2.

DETAILED DESCRIPTION OF THE ILLUSTRATED EMBODIMENT

Figure 4:
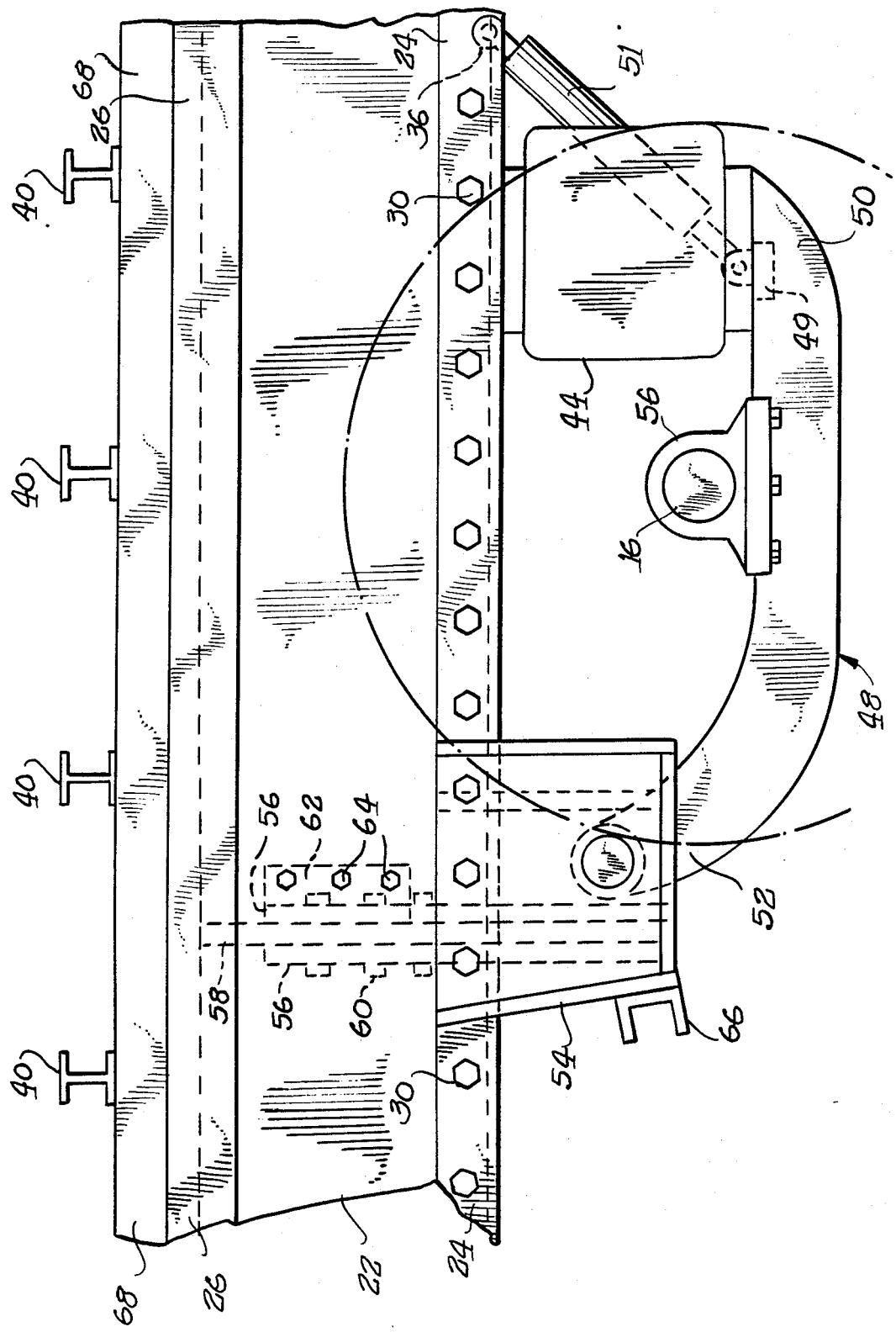
FIG. 4 is an enlarged side elevational view of the suspension means provided on each set of rear wheels.

Referring now to FIG. 1, there is shown a flatbed semi-trailer vehicle 10, which, near its leading edge is pivotally attached to and supported by a truck tractor 12 by well known means utilizing a fifth wheel device 14. The trailing portion of the semi-trailer vehicle 10 is provided with at least one set of wheels 16 mounted in a conventional, well known manner, said set of wheels 16 providing support for and allowing mobility of the semi-trailer vehicle 10. As is discussed in greater detail below, the preferred embodiment of the invention utilizes two sets of wheels 16, spread apart farther than normal to better distribute the forces associated with the vehicle 10 and freight loads carried thereby.

As best see in FIGS. 2 and 3, the innovative semi-trailer vehicle 10 comprises at least two longitudinal support beams 18 which serve as force transmission members for the weight loads associated with the remaining vehicle components and freight loads to be carried by the semi-trailer vehicle 10. Preferably, the beams 18 are made from aluminum in the manner described in detail below to maximize weight reduction, but other suitable materials may also be used. Each longitudinal aluminum support beam 18 is comprised of at least four individual components, an upper portion being made up of a set of partially open-channel shaped aluminum members 20, a central section comprising a flat plate-like aluminum member 22, and the lower edge being an L-shaped aluminum channel 24, each individual component extending substantially the entire length of the semi-trailer vehicle 10. In the present form of the invention, the upper partially open-channel shaped members 20 are joined in parallel relationship with one another and have a lower flanged portion 26 shaped to accommodate an upper edge of the central plate-like member 22, which is sandwiched and fastened by bolts 28 (FIG. 3) between the two partially opened channeled members 20 and extends downward therefrom. The L-shaped aluminum channel member 24 engages a lower edge of the central plate-like member 22 and is secured thereto by bolts 30 (FIG. 4) in a manner such that a horizontal leg 32 thereof covers a bottom edge of the plate-like member 22 and a vertical leg 34 thereof remains flush with the outer surface of the plate-member 22 with respect to a longitudinal center axis of semi-trailer vehicle 1.

In accordance with a further aspect of the invention the plate-like central member 22 of longitudinal aluminum support beam 18 can be gradually reduced in cross-sectional height to facilitate proper connection between the semi-trailer vehicle and the truck tractor 12 near the forward end of the semi-trailer vehicle 10 as illustrated in FIG. 1.

Provision is made for interconnecting the longitudinal aluminum support beams 18 by means of a stress plate 36 positioned horizontally between the two intermost partially opened channel shaped members 20 of the longitudinal aluminum support beams 18 and fixedly attached thereto by a plurality of bolts 38 (FIG. 2). The stress plate 36, preferably extends substantially the entire length of the semi-trailer vehicle 10 and, in the preferred embodiment of the invention, is formed of aluminum approximately 30 inches wide, and at least 3/16 of an inch thick. The stress plate 36 is positioned to distribute stresses encountered equally between its longitudinal and transverse directions. In this way the stress plate 36 will prevent distortion of the longitudinal aluminum support beams 18 while the semi-trailer vehicle 10 is in motion, and especially as it is negotiated about roadway curves and corners.

In keeping with one of the principle objects of the inventive semi-trailer vehicle 10, and as best seen in FIGS. 3 and 4, a series of aluminum cross-beams 40 is provided, which cross-beams extend across and are bolted to the upper surface of longitudinal support beams 18 such that a perpendicular relationship is maintained between each aluminum cross-beam 40 and each longitudinal support beam 18. The aluminum cross-beams 40 extend a predetermined distance beyond the outer surfaces of longitudinal support beams 18 and preferably, for the full width of the trailer. Additionally, bolts 42 serve to fix said aluminum cross-beams 40 to the longitudinal beams 18 in a predetermined spaced relationship with one another.

It is important that the aluminum cross-beams 40 are spaced apart so that a standard forklift truck is able to conduct loading and unloading procedures utilizing the aluminum cross-beams 40 in a manner identical to that in which a lowermost layer of dunnage is utilized in a conventional flatbed semi-trailer vehicle. It is therefore apparent that the aluminum cross-beams 40 function not only as standard load distribution members in the innovative semi-trailer vehicle 10, but that they also eliminate the cost of and need for the lowermost level of dunnage and consequently reduce the overall weight of a loaded semi-trailer/tractor rig in significant amount. Attention is drawn to the fact that the aforementioned structure results in a weight reduction of approximately 3,000 pounds as compared with a standard semi-trailer design and that the normal amount of dunnage required to support a standard 40 foot long semi-trailer load can range in weight from 1,500 to 5,000 pounds. Therefore, without increasing the loading time or hampering maneuverability, the innovative semi-trailer design effectively reduces overall weight and allows for transport of heavier loads within the normal 80,000 pound highway vehicle weight limit. It is evident that such an improved semi-trailer design results in increased shipment efficiency and a reduction of associated costs.

In some situations, such as when the semi-trailer 10 is used to haul cargo comprising gypsum board or the like, use of the aluminum cross-beams 40 in place of the lowermost layer of dunnage might cause an undesirable side-effect. That is, the direct contact between the relatively rigid aluminum cross-beams 40 and a typical freight load of gypsum or the like may result in damage to the gypsum when the semi-trailer encounters road shocks and/or vibrations such as are caused by pothole and other roadway imperfections.

To minimize this problem, and improve the rideability and safety of the semi-trailer design 10 in general, fluid suspension means is provided at each set of wheels as shown in FIG. 1. The fluid suspension means comprises air bag springs 44, which can be of a known bellows-type, operatively connected at each set of wheels 16 with an axle carriage 46 which together act to effectively isolate the effects of any road vibrations and allow the cargo carried by the semi-trailer 10 to be substantially unaffected thereby. The chances of the cargo bouncing or pounding on the cross members 40 is therefore minimized and any risk of damage to the cargo as a result of the direct contact between the cargo and the cross members 40 is substantially eliminated. It should be noted that this result cannot be attained by use of conventional mechanical spring-type suspension means.

Referring to FIG. 4, it will be seen that at each set of wheels 16, the axle carriage 46 includes a pair of main braces 48 (only one shown) which connect individually at rearward ends 50 thereof to individual air-bag springs 44 which are in turn attached to each longitudinal support beam 18. The rearward ends 50 are linked together by rear cross member 49 which extends substantially perpendicular to the main braces 48 and is securely fastened thereto. Approximately intermediate said rear cross member 49, the axle carriage 46 further includes a shock absorber 51 which is pivotally attached between the rear cross member 49 and the stress plate 36 at a predetermined angle. The main braces 48 extend forward from the springs 44 to pivotally attach individually at forward ends 52 thereof to a pair of front hangers 54 aligned with the springs 44. Substantially intermediate each rearward end 50 and each forward end 52, the main braces 48 are equipped with clamps 56 for interconnecting each set of wheels 16 with the axle carriage 46. In operation, road potholes or the like cause the wheel sets 16 to move vertically upward or downward. However, this movement does not significantly effect the cargo because the motion is isolated by the axle carriage 46 and the air-bag springs 44 thereby allowing the remaining components of the semi-trailer, including the cross members 40 in contact with the cargo to essentially float down the roadway.

As earlier noted, the wheel sets 16 are spaced apart farther than is conventional on the inventive semi-trailer vehicle 10 to improve force distribution. At lower speeds, and especially during turning and cornering of the vehicle 10 this increased wheel separation may cause the individual wheel sets 16 to pivot about a fulcrum located substantially intermediate the wheel sets 16 and thereby possibly impart adverse stresses and strains on the vehicle structure. To prevent damage in this regard, each front hanger 54 further includes a pair of gusset portions 56 extending in parallel relationship with one another inwardly and upwardly to surroundingly engage a cross support 58 with bolts 60. The cross support 58 is rigidly fixed between the longitudinal beams 18 by utilization of flanges 62 and bolts 64 provided at each side of the cross support 58 as illustrated. The structure of the axle carriage 46 is completed by interconnecting the two front hangers 54 with a channel member 66. Preferably, the axle carriage 46 is formed of steel or other high-strength materials so as to provide structural integrity to the semi-trailer and eliminate the problems discussed above.

In still another aspect of the invention, as best seen in FIGS. 2 and 3, the distal ends of each cross-beam member 40 are joined together on both sides of the semi-trailer vehicle 10 by means of an aluminum U-shaped rub rail 68, the rub rail 68 opening downwardly and extending substantially the entire length of each side of the semi-trailer vehicle 10. In the preferred embodiment of the invention, the upper surface of the rub rail 68 is bolted to the lower surface of each cross beam 40, utilizing a plurality of fasteners 70 (FIG. 2). The rub rails 68 provide structural rigidity and prevent foreign objects from coming into contact with the freight loads being carried.

As a further aspect of the invention, thin aluminum sheets form splash guards 72 which are tack-welded as at 74 between the opposing surfaces of each rub rail 60 and each longitudinal support beam 18. The guards 72 extend horizontally substantially the entire length of the semi-trailer 10 at a level equal to that of the uppermost surface of each rub rail 68. The splash guards 72 provide a barrier against water and debris on the roadway which otherwise could be splashed up onto the freight load as a result of tire rotation during vehicle operation.

While the invention has been described in connection with the preferred embodiment, it will be understood that it is not intended to limit the invention thereto, but rather to cover all modifications and alternative constructions falling within the spirit and scope of the invention as expressed in the appended claims.

The invention is claimed as follows:

1. A semi-trailer for hauling freight loads, comprising: longitudinally extending load bearing support frame means; a series including a multiplicity of cross support members extending transversely of and supported above said support frame means and extending substantially the entire width of the semi-trailer for receiving and supporting freight loads, said semi-trailer being free of any decking overlying said cross support members; said cross frame members defining spaced therebetween for receiving means such as a fork lift for loading and unloading freight loads; and suspension means for isolating the effects of road vibrations from said support frame means and freight loads supported thereby.

2. The semi-trailer as recited in claim 1, wherein said suspension means comprises air-bag spring means acting in cooperation with axle carriage means, said air-bag spring means and said axle carriage means being coupled together and fastened to said support frame means for minimizing the transmission of road vibrations to the freight load being hauled by said semi-trailer.

3. The semi-trailer as recited in claim 2, wherein said axle carriage means comprises a system of support members including a pair of main braces pivotally attached to said longitudinal support frame at forward ends thereof and extending longitudinally rearward in parallel relationship with each other to connect with said air-bag spring means at rearward ends thereof and having means for supporting a wheel axle mounted intermediate said forward and rearward ends.

4. The semi-trailer as recited in claim 3, wherein said axle carriage means further comprises first and second cross support means for interconnecting said forward and rearward ends of said main braces.

5. The semi-trailer as recited in claim 4, wherein said first means for interconnecting said main braces includes shock absorber means for dampening road vibrations absorbed by said air-bag spring means.

6. The semi-trailer as recited in claim 5, wherein said second means for interconnecting said main braces includes . gusset members and transverse support means for stabilizing and maintaining the structural integrity of said suspension means during low speed turning and maneuvering of said semi-trailer.

7. The semi-trailer as recited in claim 1, wherein said semi-trailer vehicle includes at least two rear axles, each of said rear axles being separately equipped with said fluid suspension means.

8. The semi-trailer as recited in claim 2, wherein said axle carriage means is formed from steel.

9. A semi-trailer for hauling cargo, comprising: longitudinally extending load bearing support frame means; a multiplicity of transverse support members fastened to an upper surface of, and generally uniformly spaced along the entire length of said longitudinal support frame means for receiving and directly supporting cargo and facilitating cargo loading and unloading procedures; suspension means comprising an axial carriage pivotally connected to said support frame means and air-spring means for isolating the effects of road vibration from the support frame means and allowing cargo to be safely transported without sustaining damage.

10. The semi-trailer as recited in claim 9, wherein said axle carriage means includes means for cross supporting said suspension means against torsional forces developed during load speed maneuvering of said semi-trailer.

11. The semi-trailer as recited in claim 10, wherein said means for cross supporting said suspension means includes shock absorber means for dampening the road vibrations absorbed by said air spring means.

* * * * *